United States Patent [19]
Okumura et al.

[11] Patent Number: 6,100,633
[45] Date of Patent: Aug. 8, 2000

[54] PLASMA DISPLAY PANEL WITH PHOSPHOR MICROSPHERES

[75] Inventors: Miwa Okumura, Kawasaki; Naotoshi Matsuda, Tokyo; Masaaki Tamatani, Fujisawa; Ariane Keiko Albessard, Yokohama, all of Japan

[73] Assignee: Kabushiki Kaisha Toshiba, Kawasaki, Japan

[21] Appl. No.: 08/939,491

[22] Filed: Sep. 29, 1997

[30] Foreign Application Priority Data

Sep. 30, 1996 [JP] Japan .................................. 8-258508

[51] Int. Cl.⁷ .................................................. H01J 63/04
[52] U.S. Cl. ........................ 313/486; 313/113; 313/584; 252/301.4 R
[58] Field of Search .................... 313/467, 468, 313/486, 487, 112, 113, 114, 584, 585, 586; 252/301.4 R, 301.5

[56] References Cited

U.S. PATENT DOCUMENTS

| | | | |
|---|---|---|---|
| 3,995,191 | 11/1976 | Kaduk et al. | 313/113 |
| 4,803,402 | 2/1989 | Raber et al. | 313/586 |
| 4,827,186 | 5/1989 | Knauer et al. | 313/486 |
| 5,182,489 | 1/1993 | Sano | 313/585 |
| 5,214,345 | 5/1993 | Saito et al. | 313/112 |
| 5,442,254 | 8/1995 | Jaskie | 313/486 |
| 5,644,193 | 7/1997 | Matsuda et al. | 313/486 |
| 5,811,924 | 9/1998 | Okumura et al. | 313/467 |

FOREIGN PATENT DOCUMENTS

| | | | |
|---|---|---|---|
| 5-61080 | 3/1993 | Japan | G02F 1/35 |
| 7-320645 | 12/1995 | Japan | H01J 11/02 |
| 8-092553 | 4/1996 | Japan | C09K 11/68 |
| 8-092554 | 4/1996 | Japan | C09K 11/84 |
| 8-109375 | 4/1996 | Japan | C09K 11/78 |
| 8-134443 | 5/1996 | Japan | C09K 11/78 |

OTHER PUBLICATIONS

C. G. B. Garrett, et al., "Stimulated Emission into Optical Whispering Modes of Spheres", Physical Review, vol. 124, No. 6, Dec. 15, 1961, pp. 1807–1857.

K. Miura, et al., "Laser Oscillation of a $Nd^{3+}$–Doped Fluoride Glass Microsphere", Journal of Materials Science Letters 15 (1996), pp. 1854–1857.

T. Akiyama, et al., "Evaluations of Discharge Cell Structure for Color AC Plasma Display Panels", Abstract of the 261st meeting of Phosphor Society of Japan, (1996), p. 1.

Abstract of the $267^{th}$ meeting of Phosphor Society of Japan (1997), pp. 5–13, (no month).

*Primary Examiner*—Michael Day
*Attorney, Agent, or Firm*—Oblon, Spivak, McClelland, Maier & Neustadt, P.C.

[57] ABSTRACT

The present invention provides a plasma display panel, comprising a rear substrate provided with ribs defining discharge cells, address electrodes and phosphor layers, and a front substrate provided with transparent electrodes extending in a direction perpendicular to the address electrodes, a transparent dielectric layer and a protective layer, discharge being brought about within the discharge cell formed between the rear substrate and the front substrate to excite the phosphor contained in the phosphor layer so as to cause the phosphor to emit a visible light. In this plasma display panel, the phosphor particles forming the phosphor layer have an average particle size of 0.1 to 5 $\mu$m and a ratio of the largest curvature to the smallest curvature of at most 1.5. Also, the magnitude of the irregularities on the surface of the phosphor particle is at most 5% of the diameter of the phosphor particle.

9 Claims, 4 Drawing Sheets

PLASMA DISPLAY PANEL WITH PHOSPHOR MICROSPHERES

BACKGROUND OF THE INVENTION

The present invention relates to a plasma display panel (PDP) and a phosphor adapted for use in various displays such as PDP.

The plasma display panel (PDP), which is adapted for preparation of a large screen and can be made thinner, attracts attention as a flat display panel which can be used in place of a cathode ray tube (CRT).

A surface discharge AC type PDP comprises a rear substrate provided with ribs defining discharge cells, address electrodes formed in the discharge cells and phosphor layers, and a front substrate provided with transparent electrodes extending in a direction perpendicular to the address electrodes, a transparent dielectric layer and a protective layer. The phosphor layer is formed by coating the discharge cells by means of, for example, a screen printing technique, with a paste of phosphor particles emitting red (R), green (G) or blue (B) lights, followed by drying the coating. Thickness of the phosphor layer is set at about 20 μm. A mixed gas such as He—Xe or Ne—Xe is sealed as a discharge gas in the discharge cell formed between the rear substrate and the front substrate. In the PDP of this type, a surface discharge is brought about in the vicinity of the front substrate within the discharge cells. As a result, ultraviolet light is generated from the discharge gas sealed in the discharge cell, and the generated ultraviolet light excites the phosphor so as to permit the phosphor to emit a visible light.

It was customary in the past to form the phosphor layer of the PDP by using the phosphor prepared by the firing method using a flux. The phosphor particles prepared by this method are polyhedral. It should be noted that polyhedral phosphor particles are poor in dispersion capability. Therefore, if used for preparing a phosphor paste, the polyhedral phosphor particles tend to aggregate, giving rise to serious problems. For example, voids are generated within the phosphor layer, if a phosphor layer is formed by coating the paste. As a result, the thickness of the phosphor layer is increased so as to diminish the discharge space of the cell and, thus, to decrease the ultraviolet light serving to excite the phosphor. It follows that the brightness of the PDP is lowered. It should also be noted that, if a phosphor layer is formed by coating the paste containing polyhedral phosphors, the phosphor layer surface becomes irregular. Since the irregular surface of the phosphor layer brings about irregular reflection of light, the light loss is increased so as to lower the brightness. In addition, the brightness is rendered nonuniform over the entire region of the phosphor screen. As a matter of fact, the brightness of the PDP available on the market is 0.8 [lm/W] in terms of the entire efficiency in contrast to 1.7 [lm/W] for the CRT.

In order to increase the brightness of the PDP, various measures have been taken to date, including, for example the measures given below:

(1) Phosphor particles having a particle size of at most 1.5 μm should be used for forming a phosphor layer;
(2) The thickness of the phosphor layer should be gradually increased towards the front substrate; and
(3) A white reflective layer consisting of titanium oxide should be formed below the phosphor layer.

However, any of these measures fails to essentially resolve the problem of the reduced brightness caused by the diminished discharge space resulting from the increased thickness of the phosphor layer and by the irregular reflection of light resulting from the irregular surface of the phosphor layer. Of course, it is of high importance to improve the brightness of the PDP.

It should also be noted that the conventional PDP is low in response speed, giving rise to a problem that an afterimage is generated in the case of displaying a moving picture. Particularly, a $Zn_2SiO_4$:Mn phosphor widely used as a green-emitting phosphor has a long life and, thus, is likely to generate a green afterimage. Naturally, it is also of high importance to suppress generation of an afterimage in the PDP.

BRIEF SUMMARY OF THE INVENTION

An object of the present invention is to provide a plasma display panel which exhibits a high brightness and is unlikely to generate an afterimage. Another object is to provide a phosphor exhibiting a high quantum efficiency, having a short emission life time, and contributing to the improvement of the display performance.

According to an aspect of the present invention, there is provided a plasma display panel, comprising a rear substrate provided with ribs defining discharge cells, address electrodes and a phosphor layer, and a front substrate provided with transparent electrodes extending in a direction perpendicular to the address electrodes, a transparent dielectric layer and a protective layer, discharge being brought about within the discharge cell formed between the rear substrate and the front substrate to excite the phosphor contained in the phosphor layer so as to cause the phosphor to emit a visible light, wherein the phosphor particles forming the phosphor layer have an average particle size of 0.1 to 5 μm and an aspect ratio of 1.0 to 1.5.

According to another aspect of the present invention, there is provided a plasma display panel, comprising a rear substrate provided with ribs defining discharge cells, address electrodes and a phosphor layer, and a front substrate provided with transparent electrodes extending in a direction perpendicular to the address electrodes, a transparent dielectric layer and a protective layer, discharge being brought about within the discharge cell formed between the rear substrate and the front substrate to excite the phosphor contained in the phosphor layer so as to cause the phosphor to emit a visible light, wherein the phosphor particles forming the phosphor layer have an average particle size of 0.1 to 5 μm and a ratio of the largest curvature to the smallest curvature of at most 1.5.

The phosphor of the present invention has an average particle size falling within a range of between 0.1 μm and 20 μm and exhibits a so-called "microresonator effect". Also, the surface roughness of the phosphor is not larger than 5% of the particle size.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
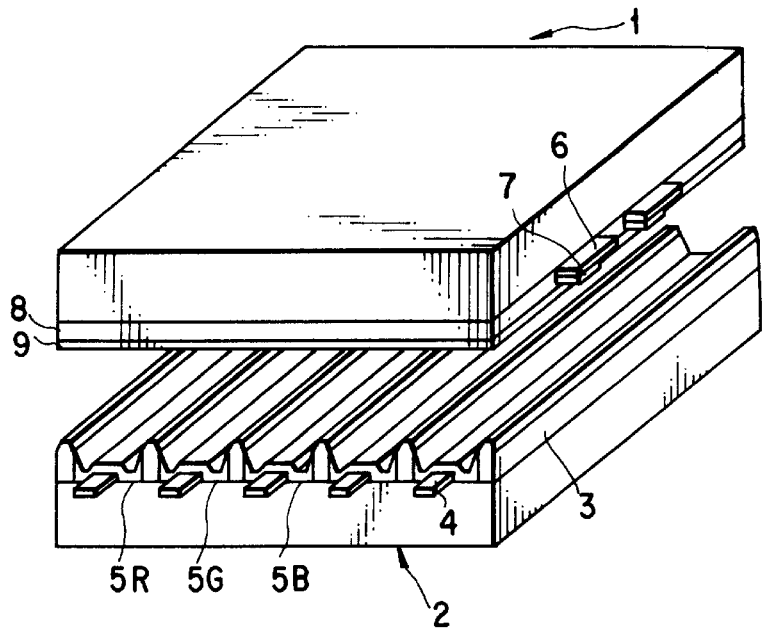
FIG. 1 is an exploded view of a surface discharge AC type plasma display panel (PDP) according to the present invention.

FIG. 1 shows the construction of a surface discharge AC type plasma display panel (PDP) according to the present invention. As shown in the drawing, the PDP comprises a front substrate 1 and a rear substrate 2. Ribs 3 arranged in parallel to form stripes are formed on the rear substrate 2 in a manner to define stripe-like discharge cells. Also, stripe-like address electrodes 4 are formed between adjacent ribs 3 such that each discharge cell formed between adjacent ribs 3 is provided with the address electrode 4. Further, phosphor layers 5 are formed which cover the surfaces of the rear substrate 2, address electrodes 4 and ribs 3. The phosphor layer 5 contains a red-emitting phosphor, a green-emitting phosphor or a blue-emitting phosphor. On the other hand, formed on the front substrate 6 are stripe-like transparent electrodes 6 extending in a direction perpendicular to the address electrodes 4 and bus electrodes 7 overlapping with the transparent electrodes 7 to lower the resistance of the transparent electrodes 7. The surface of the front substrate 1 is covered with a transparent dielectric layer 8 and a protective layer 9. The protective layer 9 consisting of, for example, MgO serves to improve the discharge characteristics. The front substrate 1 of the particular construction is disposed on the rear substrate 2 of the construction described above, followed by sealing the junction between the front and rear substrates. Further, a mixed gas such as He—Xe or Ne—Xe is sealed as a discharge gas in the discharge cells formed between the rear substrate 2 and the front substrate 1.

The surface discharge AC type PDP of the construction described above is operated as follows. Specifically, if a surface discharge is brought about in the vicinity of the front substrate within the discharge cell, the discharge gas sealed in the discharge cell emits vacuum ultraviolet (VUV) rays having wavelengths of mainly 147 nm and 172 nm. As a result, the phosphor in the phosphor layer is excited by the vacuum ultraviolet rays and emits a visible light when the excited state is brought back to the ground state.

The phosphor layer 5 contains phosphors exemplified below, though the phosphors used in the present invention are not limited to those exemplified below. Specifically, the red-emitting phosphors used in the present invention include, for example, $Y_2O_3$:Eu, $(Y, Gd)_2O_3$:Eu, $Y_2SiO_5$:Eu, $YBO_3$:Eu, $(Y,Gd)BO_3$:Eu, $GdBO_3$:Eu, and $ScBO_3$:Eu. The green-emitting phosphors used in the present invention include, for example, $BaAl_{12}O_{19}$:Mn, $YBO_3$:Tb, and $Zn_2SiO_4$:Mn. Further, the blue-emitting phosphors used in the present invention include, for example, $BaMgAl_{14}O_{23}$:Eu$^{+2}$, $CaWO_4$:Pb and $Y_2SiO_5$:Ce.

Transparent phosphor particles, which are substantially spherical and substantially free from projections such as edges on the surfaces, are used for forming the phosphor layer included in the PDP of the present invention. To be more specific, the phosphor particles should have an average particle size of 0.1 to 5 μm, preferably 0.5 to 1 μm, and an aspect ratio, i.e., a ratio of the longest diameter to the shortest diameter, of 1.0 to 1.5. If the average particle size of the phosphor particles is less than 0.1 μm, the brightness of the phosphor screen is low. Where the average particle size exceeds 5 μm, however, the phosphor layer formed by coating tends to have an irregular surface. The aspect ratio of the phosphor particles, which should be 1.0 to 1.5, should preferably be 1.0 to 1.2 and, more preferably 1.0 to 1.1. Where the aspect ratio of the phosphor particles exceeds 1.5, the phosphor layer formed by coating of the phosphor particles tends to have an irregular surface.

If a paste is prepared by using the spherical phosphor particles defined in the present invention, the phosphor particles are sufficiently dispersed in the paste, with the result that the phosphor particles are not aggregated together so as to lower the viscosity of the resultant paste. Where a phosphor layer is formed by coating the particular paste, void formation within the phosphor layer is suppressed. Also, the phosphor layer is allowed to have a smooth surface free from irregularity. It follows that the packing density can be increased by 50 to 65% compared with the case where conventional phosphor particles are used. As a result, it is possible to prevent an irregular reflection of the light emitted from the phosphor so as to suppress loss of light and, thus, to improve the brightness of the PDP. Also, the smooth surface of the phosphor layer permits enlarging the discharge space, which also contributes to an improvement of the brightness.

The spherical phosphor particles used in the present invention can be prepared by, for example, melting raw material phosphor particles within a heat plasma, followed by rapidly cooling the melt. A method of preparing spherical phosphor particles by utilizing a heat plasma is disclosed in, for example, Japanese Patent Disclosure (Kokai) No. 8-109375. It is also possible to prepare spherical phosphor particles by means of plasma spray coating.

Particularly, where the PDP is required to exhibit a high emission efficiency and a high accuracy in the color of the emitted light, it is desirable to use spherical phosphor particles having chromaticity coordinates (x, y), which is used as an index of whiteness degree, of:

$0.31 \leq x \leq 0.33$ $0.31 \leq y \leq 0.33$

The phosphor particles whose chromaticity coordinates fall within the range given above are less colored, making it possible to avoid reduction of the emission efficiency and influences given to the color emission. Further, it is desirable for the spherical phosphor particles of the present invention to have a reflectance of at least 95%.

For forming the phosphor layer by using the particular spherical phosphor particles, a phosphor powder for each color is mixed in a binder solution consisting of, for example, polyvinyl alcohol, n-butyl alcohol, ethylene glycol and water so as to prepare a paste. Then, the resultant paste is coated by means of, for example, screen printing so as to form the desired phosphor layer.

It is desirable for the phosphor layer to have a uniform thickness. To be more specific, a difference in thickness of the phosphor layer between a point 20 $\mu$m apart from the upper edge of the rib and a central point of the address electrode should be at most 25%, preferably at most 20%. A phosphor layer meeting this requirement is considered to have a uniform thickness. A phosphor layer having a uniform thickness can be irradiated uniformly with ultraviolet rays. Where the phosphor layer has a large local difference in thickness, some phosphor particles are positioned behind other phosphor particles, resulting in failure to be irradiated with the ultraviolet rays. It should be noted that the spherical phosphor particles defined in the present invention are also advantageous in making the phosphor layer thickness uniform.

In order to permit the light emitted from the phosphor to be transmitted efficiently to the outside, it is effective to dispose a reflective layer of a visible light between the phosphor layer and the rear substrate and between the phosphor layer and the rib. For increasing the reflection of the emitted light, it is desirable to form a visible light reflective layer over substantially the entire region between the phosphor layer and each of the other members of the PDP including the rear substrate, the address electrode and the rib. The materials effectively reflecting the visible light, which can be used in the present invention, include, for example, particles of $MgO$, $MgF_2$, $\alpha$-$Al_2O_3$, $MgAl_2O_4$, $3Al_2O_3 \cdot 5SiO_2$ and $2MgO \cdot 2Al_2O_3 \cdot 5SiO_2$. Particularly, $MgO$ particles can be used as the materials effectively reflecting the visible light. It is desirable for these materials to have an average particle size of 10 to 200 nm. The particles having an average particle size falling within the range noted above permit effectively scattering the visible light. Also, these materials are satisfactory in the electron emitting characteristics, compared with $TiO_2$ used for forming a known white reflective layer. It follows that the materials used for forming the visible light reflective layer are also effective for facilitating the discharge. The visible light reflective layer should desirably have a thickness of 0.1 to 5 $\mu$m, preferably 0.1 to 1 $\mu$m. Where the thickness is less than 0.1 $\mu$m, the effect of reflecting the visible light cannot be obtained. Where the thickness exceeds 5 $\mu$m, however, the discharge space is diminished, leading to a low brightness.

Figure 2:
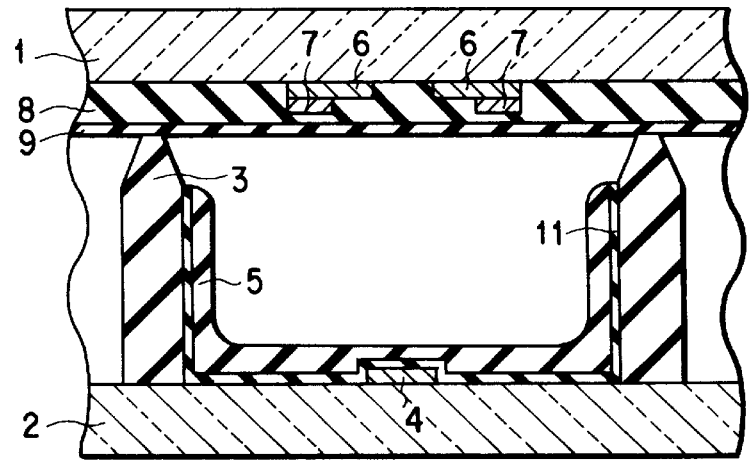
FIG. 2 is a cross sectional view showing a PDP provided with a reflective layer of a visible light.

FIG. 2 is a cross sectional view of a PDP showing that a visible light reflective layer 11 is formed to cover the rear substrate 2, the address electrode 4 and the side surface of the rib 3, and that the phosphor layer 5 is formed to cover the visible light reflective layer 11.

If the phosphor layer 5 is formed by using spherical phosphor particles exhibiting a micro-resonator effect, the quantum efficiency which is said to be 30 to 80% in general can be improved in the present invention, leading to an improved brightness of the PDP. The term "micro-resonator effect" denotes a phenomenon which was observed first by Garrett et al. in $CaF_2$:Sm crystal sphere having a size of about 100 $\mu$m (C. G. Garrett et al., Phys. Rev. 124, 1807 (1961)). It is described in this literature that, if light is incident into the crystal sphere, total reflection of the light is repeated within the sphere to cause the light to be confined in the sphere, with the result that laser oscillation is brought about. The micro-resonator effect is also observed in other materials, e.g., polystyrene transparent microsphere having a size of about 40 $\mu$m and doped with Nile Red and fluoride glass sphere having a size of about 100 $\mu$m and doped with $Nd^{3+}$. Further, it is observed in an Eu chelate compound that a transition probability is increased by the micro-resonator effect so as to shorten the emission life time of Eu. However, observation of the micro-resonator effect has not yet been reported in the general crystalline rare earth phosphor.

Figure 4A:
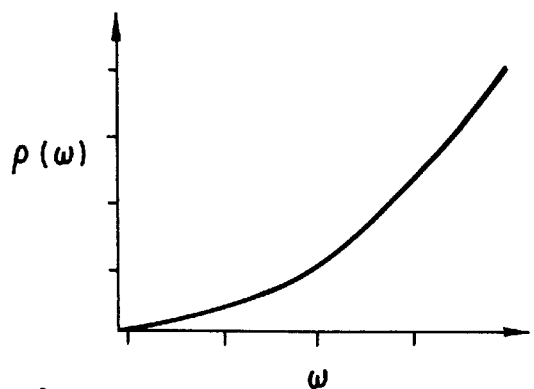
FIG. 4A is a graph showing the dependency of the density of states on frequency in the case where spontaneous emission is taking place.
Figure 4B:
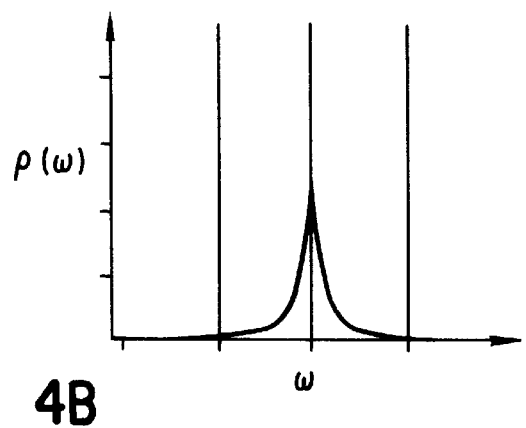
FIG. 4B is a graph showing the dependency of the density of states on frequency in the case where a microresonator effect is taking place.
Figure 4C:
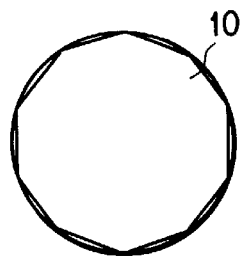
FIG. 4C shows a microresonator effect.

FIGS. 4A to 4C are intended to explain the micro-resonator effect (i.e., the effect that microsphere cause light to exhibit Whispering Gallery Mode). Specifically, FIG. 4A is a graph showing how the density of states of the light spontaneously emitted from the phosphor is dependent on the frequency. On the other hand, FIG. 4B is a graph showing how the density of states of the light is dependent on the frequency when the light is confined three dimensionally to the space inside the microsphere of the phosphor. As is seen from FIG. 4B, the light components having certain wavelengths are intensified. It should be noted in this connection that, when the light is confined within the microsphere as shown in FIG. 4C, interference and resonance of the light take place within the sphere. When the wavelength of resonance is coincident with the wavelength of the light emitted from the phosphor, emitted is light having an intensity markedly higher than that of the spontaneously emitted light and also having a short life time.

In order to permit the light to be confined within the microsphere of phosphor, it is desirable for the spherical phosphor particles to have a particle size of 0.1 to 20 $\mu$m. Where the spherical phosphor particle has a particle size smaller than 0.1 $\mu$m, the micro-resonator effect is unlikely to take place. Further, where the phosphor is used in the manufacture of a PDP, the spherical phosphor particles are required to have a particle size falling within a range of between 0.1 $\mu$m and 5 $\mu$m. If the particle size exceeds 5 $\mu$m, the phosphor layer which is formed by coating tends to have an irregular surface.

The performance of the microresonator can be evaluated by Q-value, which is a factor denoting the loss. Specifically, the larger Q-value represents the smaller loss, and vice versa. For example, a Fabry-Perot resonator consisting of two plate mirrors has a Q-value of about 5,000. Also, a light resonator formed by fine processing of a semiconductor has a Q-value of about 100 to 5,000. It should be noted that the Q-value is dependent on the processing accuracy. When it comes to a resonator consisting of a microsphere, the accuracy of the sphere corresponds to the processing accuracy such that the microsphere which is theoretically spherical has a large Q-value. In other words, the resonator effect is increased where the surface of the spherical phosphor particle is free from irregularities or foreign substances which inhibit the passage of light.

Figure 5:
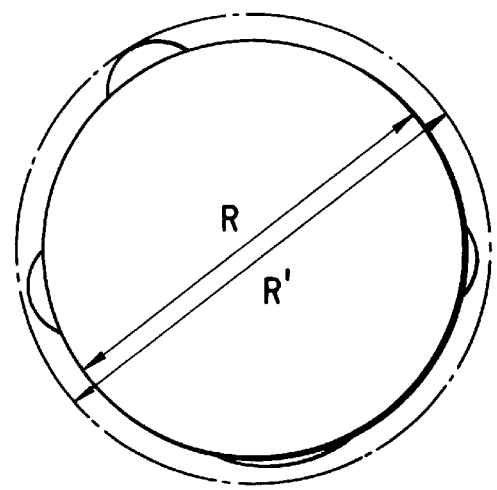
FIG. 5 shows how to calculate the surface roughness of a phosphor particle.

To be more specific, a ratio of the maximum curvature to the minimum curvature of the phosphor particle should be at most 1.5 and should desirably be close to 1.0. The phosphor particle having a curvature ratio exceeding 1.5 indicates that edges or protrusions are present on the surface of the phosphor particle. In this case, it is impossible to obtain the micro-resonator effect. It is also desirable for the irregularities on the surface of the phosphor particle to be at most 5% of the particle diameter. FIG. 5 shows how to calculate the irregularities on the surface of the phosphor particle.

Specifically, a ratio of the irregularities is given by (R'/R−1)×100, where R denotes the diameter of the sphere covering the largest area of the phosphor particle, and R' represents the diameter of the sphere whose surface includes the tip of the largest projection on the surface of the phosphor particle. Further, the amount of the ultrafine particles attached to the surface of the phosphor particle should desirably be at most 0.01% by weight. The microresonator meeting these requirements has a Q-value of 1,000 to 100,000.

Where the phosphor powder is regarded as an aggregate of microspheres, the particle size distribution should desirably be sharp. Specifically, concerning the particle size distribution, each of the difference between 80% D value and 50% D value and the difference between 50% D value and 20% D value should desirably be at most 20%. For measuring the particle size distribution, the phosphor is dispersed in water. After stirred for at least 5 minutes, the particle size distribution is measured by a particle size distribution meter such as a microtrack. In this case, the particle size is measured on the basis of the number of particles. For example, "50%D" denotes the particle size where the accumulated value starting with the particle having the smallest particle size becomes 50%.

When it comes to a phosphor powder having the sharp particle size distribution as defined in the present invention, it is possible to obtain a uniform emission of a high brightness as a whole. On the other hand, where the phosphor powder has a broad particle size distribution, the effect of increasing the brightness is weakened.

For preparing the spherical phosphor particles exhibiting the microresonator effect, the raw material phosphor particles are melted within a heat plasma, followed by rapidly cooling the melt so as to obtain spherical phosphor particles. Then, the resultant spherical phosphor particles are dispersed in water or ethanol, and an ultrasonic wave is applied to the resultant dispersion. Further, a heat treatment is applied at a suitable temperature so as to prepare the desired spherical phosphor particles.

Figure 6:
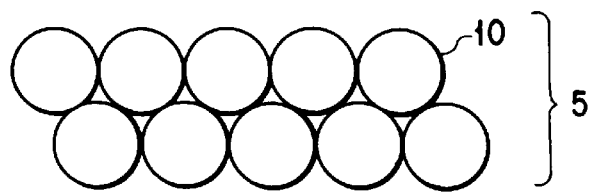
FIG. 6 shows a phosphor layer having a thickness two times as large as the average particle size of phosphor particles.

Since the spherical phosphor particle exhibiting a microresonator effect exhibits a high quantum efficiency, the thickness of the phosphor layer formed by using such phosphor particles can be decreased. The average thickness of the phosphor layer should desirably be at most 3 times the average particle size of the phosphor particles. FIG. 6 shows the phosphor layer 5 having a thickness about twice the average particle size of the phosphor particles 10. Where the phosphor layer is formed thin, the discharge space can be enlarged, making it possible to increase the intensity of the vacuum ultraviolet rays emitted from the discharge gas.

It is also possible to form a reflective layer of ultraviolet rays between the phosphor layer and the rear substrate and between the phosphor layer and the rib. Of course, the reflective layer should consist of substances capable of reflecting the vacuum ultraviolet rays and visible light. In the case of forming an ultraviolet reflective layer, the phosphor is excited from both rearward and sideward so as to obtain emission efficiently. It follows that the ultraviolet reflective layer contributes to the improvement of the density of excited light required for bringing about the microresonator effect. The substances effective for reflecting the vacuum ultraviolet rays include, for example, fluorides such as $MgF_2$, LiF, $CaF_2$, and $YF_3$. The average particle size of the fluoride particle should desirably be about 0.5 to 1 μm. The fluoride particle meeting this requirement exhibits a high capability of emitting secondary electrons and also produces the effect of lowering the discharge voltage. Further, a thin film of a metal exhibiting a high reflectance in a VUV region such as Ir can be used as the ultraviolet reflective layer.

Figure 3:
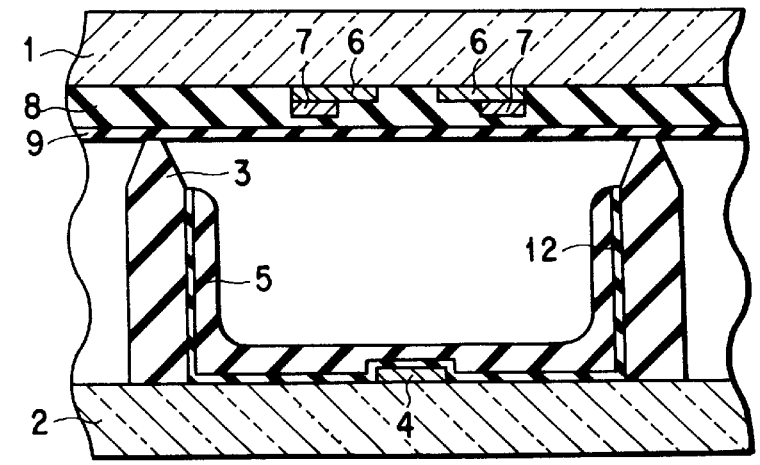
FIG. 3 is a cross sectional view showing a PDP provided with a reflective layer of an ultraviolet light.

FIG. 3 is a cross sectional view showing a PDP prepared by forming an ultraviolet reflective layer 12 to cover the rear substrate 2, the address electrode 4 and side surface of the rib 3, followed by forming the phosphor layer 5 to cover the ultraviolet ray reflective layer 12.

The microresonator effect described above can also be produced in phosphors other than those exemplified above and can also be utilized in displays other than the PDP. The phosphors adapted for producing the microresonator effect include, for example, crystals doped with a rare earth element or a transition metal element such as $Al_2O_3$:Cr, $BeAl_2O_4$:Cr, $InBO_3$:(Eu, Tb), (Y, Gd)$BO_3$:Eu, YAG:Nd, $YF_3$:Pr, $YGdF_4$:Pr, $Y_2O_3$:Eu, $Y_2O_3$:Pr, and $Y_2O_3$S:Eu. Phosphors doped with a rare earth element are suitable for use in a display.

These phosphors should also meet the requirements described previously. To reiterate, the average particle size should be 0.1 to 20 μm. Also, the irregularities on the surface of the phosphor particle should be at most 5% of the particle size. Further, the amount of the ultrafine particles attached to the surface of the phosphor particle should be at most 0.01% by weight. Still further, the phosphor particles should have a sharp particle size distribution such that each of the difference between the 80% D value and the 50% D value and the difference between the 50% D value and the 20% D value should be at most 20%.

EXAMPLES

Let us describe more in detail the present invention with reference to EXAMPLES which follow.

Comparative Example 1 and Examples 1a, 1b

An AC type PDP constructed as shown in FIG. 1 was prepared as follows. In the first step, prepared were a front substrate having transparent electrodes, bus electrodes, a transparent dielectric layer and a protective layer formed thereon and a rear substrate having address electrodes and ribs formed thereon.

For preparing a phosphor layer, each of the red-, green- and blue-emitting phosphor powders was mixed with a binder solution prepared by adding n-butyl alcohol and ethylene glycol to a 10% aqueous solution of polyvinyl alcohol having a saponification degree of 88% so as to prepare a phosphor paste. Then, predetermined cells of the rear substrate were coated with the resultant phosphor paste by screen printing method, followed by drying the coating to obtain a phosphor layer emitting red, green or blue light.

Further, the front substrate was disposed on the rear substrate having the phosphor layer formed thereon, followed by sealing the junction between the front and rear substrates. Finally, a mixed gas consisting of xenon, helium and neon was sealed in the discharge cell to establish a pressure of 500 Torr, thereby to prepare the desired PDP.

Comparative Example 1

Used were a red-emitting phosphor $Y_2O_3$:Eu, a green-emitting phosphor $BaAl_{12}O_{19}$:Mn and a blue-emitting phosphor $BaMgAl_{14}O_{23}$:$Eu^{2+}$, which were obtained by a flux method. Each of these phosphors was found to have an average particle size of 3 μm.

Example 1a

Each of the three kinds of the phosphor powders used in Comparative Example 1 was subjected to a treatment with a heat plasma. The resultant red-emitting phosphor $Y_2O_3$:Eu was found to have an average particle size of 0.9 µm and an aspect ratio, i.e., a ratio of the longest diameter to the shortest diameter, of 1.05. Also, the resultant green-emitting phosphor $BaAl_{12}O_{19}$:Mn was found to have an average particle size of 1.2 µm and an aspect ratio of 1.10. Further, the resultant blue-emitting phosphor $BaMgAl_{14}O_{23}$:$Eu^{2+}$ was found to have an average particle size of 1.0 µm and an aspect ratio of 1.10. A phosphor layer was formed by using each of these three kinds of the phosphors. The resultant phosphor layers were found to have a thickness of 20 µm at a point 20 µm apart from the tip of the rib and a thickness of 24 µm in the central point of the address electrode.

Example 1b

Before formation of the phosphor layer, a visible light reflective layer was formed as follows. Specifically, a paste was prepared by mixing MgO particles having an average particle size of 10 nm in the binder solution referred to previously. The surface of each cell of the rear substrate was coated with the resultant paste by screen printing method, followed by drying the coating, thereby to form a visible light reflective layer having a thickness of 1 µm. Then, predetermined cells of the rear substrate were coated with the three kinds of the phosphor pastes as in Example 1a, followed by drying the coating so as to form red-, green- and red-emitting phosphor layers.

The brightness of each color was measured in respect of the PDP prepared in each of Comparative Example 1, Example 1a and Example 1d, with the results as shown in Table 1 below:

TABLE 1

|  | Relative Brightness | | |
| --- | --- | --- | --- |
|  | R | G | B |
| Comparative Example 1 | 100 | 100 | 100 |
| Example 1a | 110 | 105 | 106 |
| Example 1b | 120 | 110 | 117 |

In Table 1, the brightness is given in terms of relative brightness with the brightness for Comparative Example 1 set at 100. As apparent from Table 1, the brightness was improved in each of Examples 1a and 1b, in which spherical phosphor particles were used, compared with Comparative Example 1. Further, the brightness in Example 1b, in which was formed a visible light reflective layer consisting of MgO fine particles, was found to be higher than that in Example 1a.

Comparative Example 2 and Examples 2a, 2b

A PDP was prepared as in Comparative Example 1 and Examples 1a, 1b reported above.

Comparative Example 2

Used were a red-emitting phosphor $(Y, Gd)_2O_3$:Eu, a green-emitting phosphor $Zn_2SiO_5$:Mn and a blue-emitting phosphor $BaMgAl_{14}O_{23}$:$Eu^{2+}$, which were obtained by a flux method. Each of these phosphors was found to have an average particle size of 2 µm. A phosphor layer was formed by using each of these three kinds of phosphors. The thickness of the phosphor layer was found to be nonuniform, i.e., 20 µm at a point 20 µm apart from the tip of the rib and 30 µm at a central point of the address electrode.

Example 2a

Each of the three kinds of the phosphor powders used in Comparative Example 2 was subjected to a treatment with a heat plasma to prepare spherical phosphor particles. The resultant phosphor powder was dispersed in water and subjected to washing with ultrasonic wave for 15 minutes, followed by drying. Further, the dried phosphor powder was subjected to a heat treatment at 1,000° C. for one hour.

Figure 7:
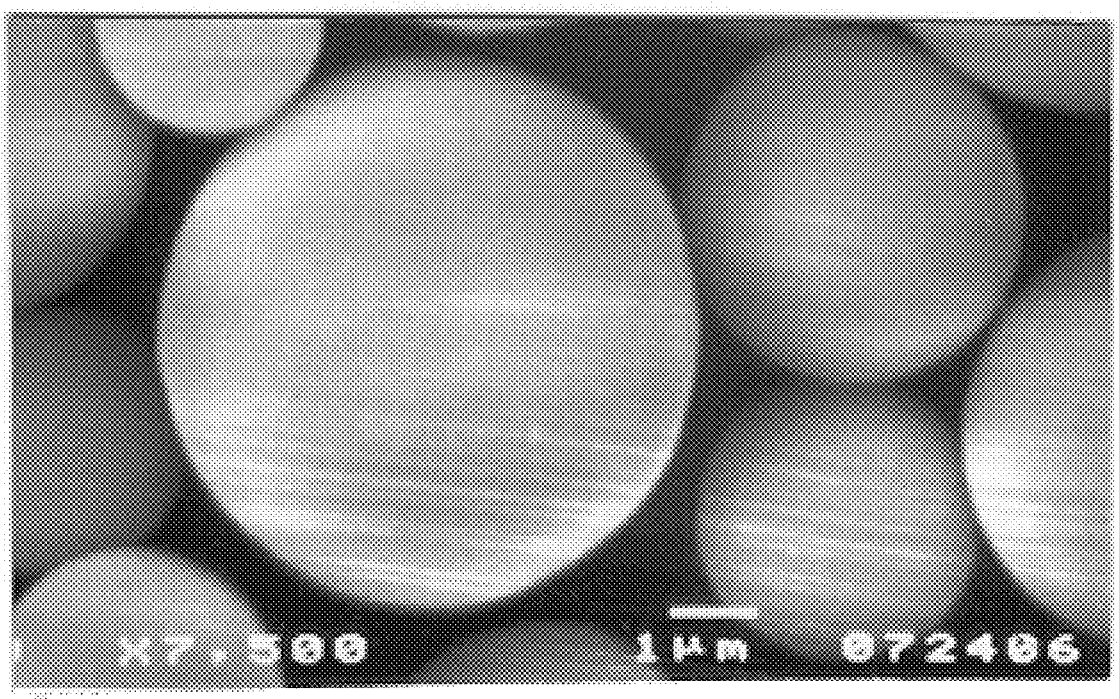
FIG. 7 is an SEM photograph showing the phosphor particles obtained in Example 2a of the present invention.

FIG. 7 is an SEM photograph showing the red-emitting phosphor particle of $(Y, Gd)_2O_3$:Eu. As apparent from the photograph, irregularities were not found on the surface of the phosphor particle. Also, ultrafine particles were not found to be attached to the surface of the phosphor particle. Further, the phosphor particles were found to have an average particle size of 2 µm. The other phosphor particles were found to have similar shapes.

A phosphor layer was formed by using each of these three kinds of the phosphors. The resultant phosphor layer was found to have a thickness of 20 µm at a point 20 µm apart from the tip of the rib and a thickness of 22 µm in the central point of the address electrode.

Example 2b

Before formation of the phosphor layer, an ultraviolet reflective layer was formed as follows. Specifically, a paste was prepared by mixing $MgF_2$ particles having an average particle size of 1 µm in a binder solution. The surface of each cell of the rear substrate was coated with the resultant paste by screen printing method, followed by drying the coating, thereby to form an ultraviolet reflective layer having a thickness of 3 µm. Then, predetermined cells of the rear substrate were coated with the three kinds of the phosphor pastes as in Example 2a, followed by drying the coating so as to form red-, green- and red-emitting phosphor layers. The average thickness of each of the phosphor layers was set to be 6 µm.

The white brightness was measured in respect of the PDP prepared in each of Comparative Example 2, Example 2a and Example 2d, with the results as shown in Table 2 below:

TABLE 2

|  | White Brightness (Relative Value) |
| --- | --- |
| Comparative Example 2 | 100 |
| Example 2a | 120 |
| Example 2b | 150 |

In Table 2, the white brightness is given in terms of relative value with the white brightness for Comparative Example 2 set at 100. As apparent from Table 2, the white brightness was improved in each of Examples 2a and 2b, compared with Comparative Example 2. Particularly, a prominent improvement in brightness was achieved in Example 2b in which the phosphor layer was formed sufficiently thin so as to provide a larger discharge space. Further, a green afterimage, which was observed in each of Comparative Example 2 and Example 2a, was not observed in Example 2b.

Comparative Example 3 and Examples 3a, 3b

Figure 8:
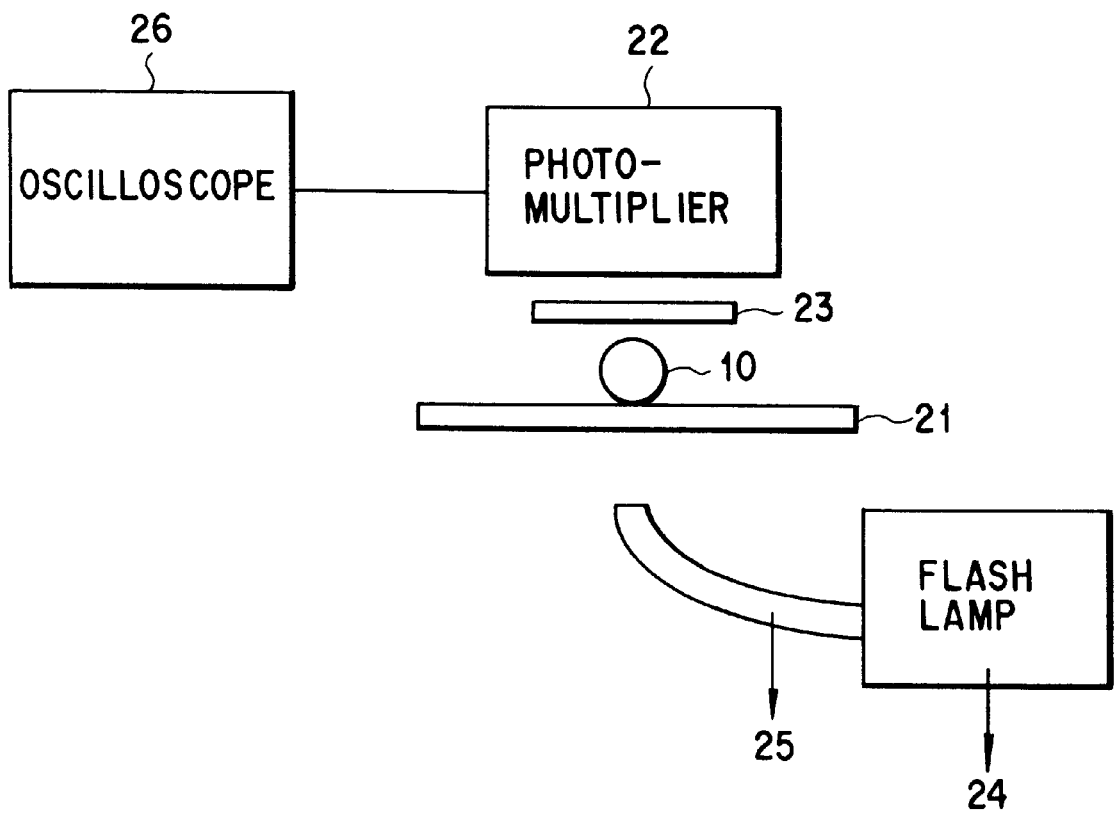
FIG. 8 shows the construction of an apparatus used for measuring the brightness and the emission life time of the phosphor particles.

The brightness and emission life time of phosphor microspheres were measured by a method shown in FIG. 8.

In the method shown in FIG. 8, phosphor particles 10 are spread on a glass plate 21. A photomultiplier 22 is arranged 10 cm above the phosphor particles. Further, a filter 23 is arranged in front of the photomultiplier 22. On the other hand, an optical fiber 25 connected to a flash lamp 24 is arranged below the glass plate 21 so as to irradiate the phosphor particles 10 with light. Further, the light emitted from the phosphor particles 10 is detected by the photomultiplier 22, and a detection signal is converted into a voltage and is output on an oscilloscope 26.

The brightness and emission life time of the phosphor microspheres were evaluated as follows. Specifically, the peak value of the signal output from the photomultiplier 22 was measured as the brightness. Also, an afterglow observed after stopping of the light irradiation was measured so as to determine as the emission life time the time required for the brightness of the afterglow to be lowered to a value which permits obtaining a signal value which is 10% of the peak value. Measurement was applied to, for example, 50 phosphor particles so as to obtain an average value.

Comparative Example 3

Particles of $Al_2O_3$ and $Cr_2O_3$, both available on the market, were weighed in a molar ratio of 1:0.1 and mixed for an hour in a ball mill. The resultant mixture was put in a crucible and baked at 1,300° C. for an hour within an electric furnace so as to prepare an $Al_2O_3$:Cr phosphor.

The resultant phosphor particles were found to be polyhedral. Concerning the particle size distribution, the phosphor particles were found to have a 50% D value of 4 $\mu$m, a 20% D value of 2 $\mu$m, and an 80% D value of 7 $\mu$m.

Example 3a

The $Al_2O_3$:Cr phosphor obtained in Comparative Example 3 was subjected to a heat plasma treatment under an argon atmosphere, a frequency of 14 MHz and a plate power of 5 kW. The powder taken out after the heat plasma treatment was dispersed in ethanol, and the dispersion was put in an ultrasonic wave washing device for application of an ultrasonic wave washing for 30 minutes. After the washing treatment, the powder was taken out of the washing device and, then, subjected to a heat treatment at 1,000° C. for an hour.

Irregularities or foreign substances were not recognized on the surfaces of the resultant phosphor particles. Also, the diameter of the resultant phosphor particle was constant regardless of the measuring point, which was 5 $\mu$m on the average, indicating that the phosphor particle was substantially spherical. Further, the amount of the ultrafine particles attached to the surface of the phosphor particle was found to be 0.001% by weight.

Example 3b

The $Al_2O_3$:Cr phosphor obtained in Example 3a was classified as follows. Specifically, 10 g of the phosphor powder was put in a beaker of 500 mL housing water. While stirring the powder-containing water with a stirrer, an ultrasonic wave was kept applied to the water for 30 minutes so as to disperse the powder particles. The resultant phosphor dispersion was quietly poured into a graduated measuring cylinder of 10L having water put therein in advance. After allowed to stand still for 30 minutes, the liquid present within a range of graduation lines 3L and 6L of the graduated measuring cylinder was sucked out with a rubber tube and, then, dried so as to obtain a phosphor powder.

Concerning the particle size distribution, the resultant phosphor powder was found to have a 50% D value of 5 $\mu$m, a 20% D value of 4.1 $\mu$m, and a 80% D value of 5.9 $\mu$m.

The brightness and the emission life time of the phosphor obtained in each of Comparative Example 3, Example 3a and Example 3b were measured by the methods described previously. Table 3 shows the results. In these measurement, used was a filter capable of transmitting light having wavelengths of 650 nm or more.

TABLE 3

|  | Brightness | Emission life time |
|---|---|---|
| Comparative Example 3 | 100 | 3 msec |
| Example 3a | 400 | 100 $\mu$sec |
| Example 3b | 300 | 300 $\mu$sec |

In Table 3, the brightness is given in terms of relative brightness with the brightness for Comparative Example 3 set at 100.

As apparent from Table 3, the phosphor in each of Examples 3a and 3b was found to be superior to that in Comparative Example 3 in each of the brightness and the emission life time.

Comparative Example 4 and Example 4

The brightness and emission life time of the $Y_2O_3$:Eu phosphor were evaluated as in Comparative Example 3, Example 3a and Example 3b.

Comparative Example 4

Used was a $Y_2O_3$:Eu phosphor available on the market.

Example 4

A $Y_2O_3$:Eu phosphor available on the market was subjected to a heat plasma treatment under an argon gas atmosphere, a frequency of 5 MHz and a plate power of 20 kW. The powder taken out after the heat plasma treatment was dispersed in ethanol and, then, put in an ultrasonic wave washing device for washing of the powder with the ultrasonic wave for 30 minutes. After the washing treatment, the powder was subjected to a heat treatment at 1,000° C. for an hour.

Irregularities or foreign substances were not recognized on the surface of the resultant phosphor particle. Also, the diameter of the resultant phosphor particle was constant regardless of the measuring point, which was 4 $\mu$m on the average, indicating that the phosphor particle was substantially spherical. Further, the amount of the ultrafine particles attached to the surface of the phosphor particle was found to be 0.001% by weight.

The brightness and the emission life time of the phosphor obtained in each of Comparative Example 4, Example 4 were measured by the methods described previously. Table 4 shows the results. In these measurement, used was a filter capable of transmitting light having wavelengths of 590 nm or more.

TABLE 4

|  | Brightness | Emission life time |
|---|---|---|
| Comparative Example 4 | 100 | 1 msec |
| Example 4 | 200 | 300 $\mu$sec |

In Table 4, the brightness is given in terms of relative brightness with the brightness for Comparative Example 4 set at 100.

As apparent from Table 4, the phosphor in Example 4 was found to be superior to that in Comparative Example 4 in each of the brightness and the emission life time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A plasma display panel, comprising:
   a rear substrate provided with ribs defining discharge cells, address electrodes and phosphor layers; and
   a front substrate provided with transparent electrodes extending in a direction perpendicular to the address electrodes, a transparent dielectric layer and a protective layer, discharge being brought about within the discharge cell formed between the rear substrate and the front substrate to excite the phosphor present in the phosphor layer, thereby causing the phosphor to emit a visible light,
   wherein the phosphor particles forming the phosphor layer have an average particle size of 0.1–5 μm, an aspect ratio of 1.0–1.5 and a particle size distribution such that each of the differences between 80% D value and 50% D value and between 50% D value and 20% D value is at most 20%.

2. The plasma display panel according to claim 1, wherein a difference in thickness of said phosphor layer between a point 20 μm apart from an upper end of said rib and a central point of said address electrode is at most 25%.

3. The plasma display panel according to claim 1, wherein a reflective layer is formed between said phosphor layer and said rear substrate and between said phosphor layer and a side surface of said rib, said reflective layer comprising a substance selected from the group consisting of MgO, $MgF_2$, $\alpha$-$Al_2O_3$, $MgAl_2O_4$, $3Al_2O_3 \cdot 5SiO_2$ and $2MgO \cdot 2Al_2O_3 \cdot 5SiO_2$.

4. The plasma display panel according to claim 3, wherein said substance has an average particle size of 10 to 200 nm.

5. A plasma display panel, comprising:
   a rear substrate provided with ribs defining discharge cells, address electrodes and a phosphor layers; and
   a front substrate provided with transparent electrodes extending in a direction perpendicular to the address electrodes, a transparent dielectric layer and a protective layer, discharge being brought about within the discharge cell formed between the rear substrate and the front substrate to excite the phosphor contained in the phosphor layer so as to cause the phosphor to emit a visible light,
   wherein the phosphor particles forming the phosphor layer have an average particle size of 0.1 to 5 μm and a ratio of the largest curvature to the smallest curvature of at most 1.5.

6. The plasma display panel according to claim 5, wherein the magnitude of the irregularities on the surface of said phosphor particle is at most 5% of the particle diameter of the phosphor particle.

7. The plasma display panel according to claim 5, wherein the amount of ultrafine particles attached to the surface of said phosphor particle is at most 0.01% by weight.

8. The plasma display panel according to claim 5, wherein an average thickness of said phosphor layer is greater than an average particle size of said phosphor particles and less than three times as large as the average particle size of said phosphor particles.

9. The plasma display panel according to claim 6, wherein a reflective layer is formed between said phosphor layer and said rear substrate and between said phosphor layer and a side surface of said rib, said reflective layer comprising a substance selected from the group consisting of $MgF_2$, LiF, $CaF_2$, $YF_3$ and Ir.

* * * * *